United States Patent
Gerber et al.

(10) Patent No.: US 9,990,326 B2
(45) Date of Patent: Jun. 5, 2018

(54) UNIVERSAL SERIAL BUS (USB) SPLIT CABLE

(71) Applicant: QUALCOMM Incorporated, San Diego, CA (US)

(72) Inventors: Nir Gerber, Haifa (IL); Craig Aiken, Longmont, CO (US); Christian Gregory Sporck, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/993,452

(22) Filed: Jan. 12, 2016

(65) Prior Publication Data

US 2017/0109311 A1  Apr. 20, 2017

Related U.S. Application Data

(60) Provisional application No. 62/241,219, filed on Oct. 14, 2015.

(51) Int. Cl.
*G06F 13/38* (2006.01)
*G06F 13/40* (2006.01)
*G06F 13/42* (2006.01)

(52) U.S. Cl.
CPC ...... *G06F 13/4081* (2013.01); *G06F 13/4068* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 7,502,878 B1* | 3/2009 | Wright | G06F 13/4022 710/37 |
| 7,657,691 B2* | 2/2010 | Luke | G06F 13/376 370/412 |
| 8,364,870 B2 | 1/2013 | Van Antwerpen et al. | |

(Continued)

FOREIGN PATENT DOCUMENTS

| CN | 104767079 A | 7/2015 |
| WO | 2015081316 A1 | 6/2015 |

OTHER PUBLICATIONS

USB-C, Universal Serial Bus Type-C Cable and Connector Specification, Revision 1.1, Apr. 3, 2015, pp. 1-248.*

(Continued)

*Primary Examiner* — Cheng-Yuan Tseng
(74) *Attorney, Agent, or Firm* — Withrow & Terranova, PLLC

(57) ABSTRACT

A Universal Serial Bus (USB) split cable is disclosed. In one aspect, the USB split cable provides a USB full-featured Type-C host plug for connecting to a USB Type-C receptacle in a USB host. In another aspect, the USB split cable provides a plurality of USB device plugs for connecting to a plurality of device clients, respectively. The plurality of USB device plugs can be configured individually with different data pin combinations to concurrently support different device clients. By providing the USB split cable, it is possible to support point-to-multipoint USB connection via the plurality of USB device plugs without a USB hub, thus improving mobility of the USB host while reducing costs and power consumption associated with the USB hub.

20 Claims, 5 Drawing Sheets

(56) References Cited

U.S. PATENT DOCUMENTS

| | | |
|---|---|---|
| 8,845,366 B2 | 9/2014 | Brown et al. |
| 9,047,257 B2 | 6/2015 | Aravindhan |
| 2013/0191568 A1 | 7/2013 | Hershko et al. |
| 2013/0225938 A1 | 8/2013 | Vlach |

OTHER PUBLICATIONS

Hewlett-Packard Company et al., "Universal Serial Bus 3.1 Specification," Revision 1.0, Jul. 26, 2013, 631 pages.
International Search Report and Written Opinion for PCT/US2016/051972, dated Dec. 15, 2016, 11 pages.
Second Written Opinion for PCT/US2016/051972, dated Sep. 12, 2017, 5 pages.
International Preliminary Report on Patentability for PCT/US2016/051972, dated Nov. 29, 2017, 21 pages.

* cited by examiner

USB Full-Featured Type-C Plug Interface (Front View)

300

| A12 | A11 | A10 | A9   | A8   | A7 | A6 | A5 | A4   | A3   | A2   | A1  |
|-----|-----|-----|------|------|----|----|----|------|------|------|-----|
| GND | RX2+| RX2-| VBUS | SBU1 | D- | D+ | CC | VBUS | TX1- | TX1+ | GND |

| B1  | B2   | B3   | B4   | B5    | B6 | B7 | B8   | B9   | B10  | B11  | B12 |
|-----|------|------|------|-------|----|----|------|------|------|------|-----|
| GND | TX2+ | TX2- | VBUS | VCONN |    |    | SBU2 | VBUS | RX1- | RX1+ | GND |

FIG. 3A
PRIOR ART

USB Type-C Receptacle Interface (Front View)

302

| A1  | A2   | A3   | A4   | A5  | A6 | A7 | A8   | A9   | A10  | A11  | A12 |
|-----|------|------|------|-----|----|----|------|------|------|------|-----|
| GND | TX1+ | TX1- | VBUS | CC1 | D+ | D- | SBU1 | VBUS | RX2- | RX2+ | GND |

| B12 | B11  | B10  | B9   | B8   | B7 | B6 | B5  | B4   | B3   | B2   | B1  |
|-----|------|------|------|------|----|----|-----|------|------|------|-----|
| GND | RX1+ | RX1- | VBUS | SBU2 | D- | D+ | CC2 | VBUS | TX2- | TX2+ | GND |

FIG. 3B
PRIOR ART

UNIVERSAL SERIAL BUS (USB) SPLIT CABLE

PRIORITY APPLICATION

The present application claims priority to U.S. Provisional Patent Application Ser. No. 62/241,219, filed on Oct. 14, 2015, and entitled "UNIVERSAL SERIAL BUS (USB) SPLIT CABLE," which is incorporated herein by reference in its entirety.

BACKGROUND

I. Field of the Disclosure

The technology of the disclosure relates generally to Universal Serial Bus (USB).

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Peripheral devices, such as portable flash drives, audio speakers, display monitors, and chargers, are often attached to the mobile communication devices for convenience and/or necessity reasons. A universal serial bus (USB) interface is an increasingly popular standard interface to connect such peripherals both outside and inside the mobile communication devices. When a peripheral device is connected to a mobile communication device via the USB interface, the peripheral device may be a USB client and the mobile communication device may act as a USB host, and vice versa.

Over the years, USB interfaces for connecting the USB host and the USB client have evolved from bulkier legacy Type-A and Type A/B interfaces to the miniaturized Type-B and Type-C interfaces. The USB Type-C interface is created especially for mobile communication devices that tend to have smaller, thinner, and lighter form factors. The USB Type-C interface enables a variety of new connectivity possibilities while retaining all of the functional benefits of the legacy USB interfaces. As such, the USB Type-C interface also inherited the point-to-point connection topology from the legacy USB interfaces. An external USB hub is typically needed to enable point-to-multipoint topology between a USB host and multiple USB device clients. Such an external USB hub typically consumes more electrical power than the mobile communication devices, which typically act as the USB host, can provide. As a result, the external USB hub often needs to be attached to an electrical power source (e.g., wall outlet) to function, thus limiting mobility of the mobile communication devices and increasing costs for end users.

SUMMARY OF THE DISCLOSURE

Aspects disclosed in the detailed description include a Universal Serial Bus (USB) split cable. In one aspect, the USB split cable provides a USB Full-Featured Type-C host plug for connecting to a USB Type-C receptacle in a USB host. In another aspect, the USB split cable provides a plurality of USB device plugs for connecting to a plurality of device clients, respectively. The plurality of USB device plugs can be configured individually with different data pin combinations to concurrently support different device clients. The plurality of USB device plugs is conductively coupled to the USB host plug via a cable splitter. By providing the USB split cable, it is possible to support point-to-multipoint USB connection via the plurality of USB device plugs without a USB hub, thus providing improved mobility of the USB host while reducing costs and power consumption associated with the USB hub.

In this regard, in one aspect, a USB split cable is provided. The USB split cable comprises a host plug comprising a plurality of host pins, the plurality of host pins comprising a plurality of data pins. The USB split cable also comprises a first device plug comprising a first set of pins having a first pin count that is less than or equal to a pin count of the plurality of host pins. The first set of pins comprises one or more first data pins. The USB split cable also comprises a second device plug comprising a second set of pins having a second pin count that is less than the pin count of the plurality of host pins. The second set of pins comprises one or more second data pins. The USB split cable also comprises a cable splitter coupled to the host plug over a host plug cable section, to the first device plug over a first device cable section, and to the second device plug over a second device cable section. The host plug cable section comprises a plurality of conductive wires coupled to the plurality of host pins. The first device cable section comprises a plurality of first conductive wires coupled to the one or more first data pins. The second device cable section comprises a plurality of second conductive wires coupled to the one or more second data pins. The first device plug and the second device plug are configured to communicate concurrently with the host plug over the one or more first data pins and the one or more second data pins, respectively.

In another aspect, a USB split cable is provided. The USB split cable comprises a means for plugging into a USB host comprising a plurality of host pins, the plurality of host pins comprising a plurality of data pins. The USB split cable also comprises a means for plugging into a first USB device client comprising a first set of pins having a first pin count that is less than or equal to a pin count of the plurality of host pins. The first set of pins comprises one or more first data pins. The USB split cable also comprises a means for plugging into a second USB device client comprising a second set of pins having a second pin count that is less than the pin count of the plurality of host pins. The second set of pins comprises one or more second data pins. The USB split cable also comprises a means for splitting cable coupled to the means for plugging into the USB host over a host plug cable section, to the means for plugging into the first USB device client over a first device cable section, and to the means for plugging into the second USB device client over a second device cable section. The host plug cable section comprises a plurality of conductive wires coupled to the plurality of host pins. The first device cable section comprises a plurality of first conductive wires coupled to the one or more first data pins. The second device cable section comprises a plurality of second conductive wires coupled to the one or more second data pins. The means for plugging into the first USB device client and the means for plugging into the second USB device client are configured to communicate concurrently with the means for plugging into the USB host over the one or more first data pins and the one or more second data pins, respectively.

BRIEF DESCRIPTION OF THE FIGURES

FIG. 3A is a schematic diagram of an exemplary USB Full-Featured Type-C plug interface as defined in a USB Type-C Cable and Connector Specification Release 1.1 (USB Type-C specification);

FIG. 3B is a schematic diagram of an exemplary USB Type-C receptacle interface as defined in the USB Type-C specification of FIG. 3A;

DETAILED DESCRIPTION

Figure 1:
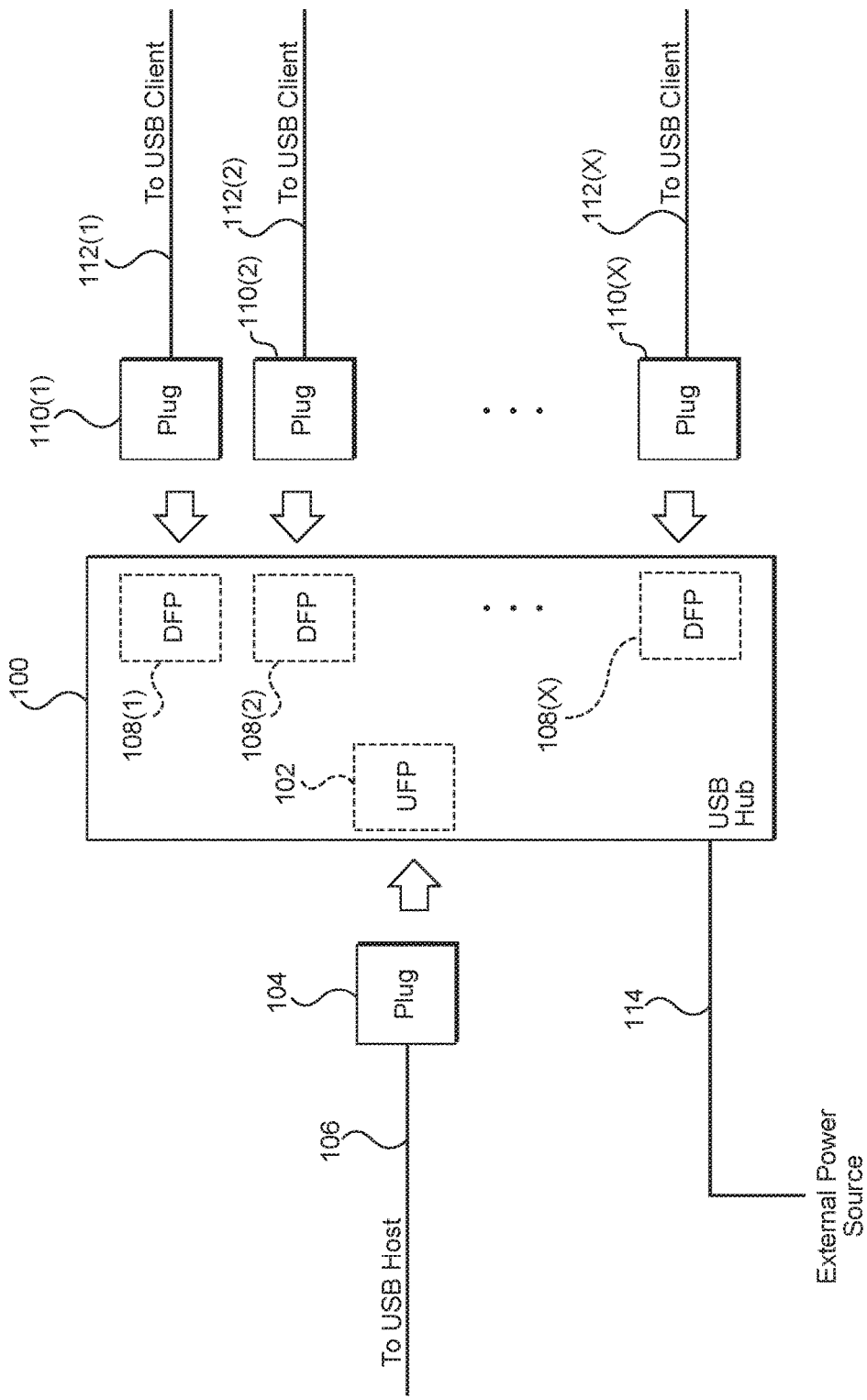
FIG. 1 is a schematic diagram of an exemplary conventional Universal Serial Bus (USB) hub for supporting a point-to-multipoint USB connection topology.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a Universal Serial Bus (USB) split cable. In one aspect, the USB split cable provides a USB Full-Featured Type-C host plug for connecting to a USB Type-C receptacle in a USB host. In another aspect, the USB split cable provides a plurality of USB device plugs for connecting to a plurality of device clients, respectively. The plurality of USB device plugs can be configured individually with different data pin combinations to concurrently support different device clients. The plurality of USB device plugs is conductively coupled to the USB host plug via a cable splitter. By providing the USB split cable, it is possible to support point-to-multipoint USB connection via the plurality of USB device plugs without a USB hub, thus providing improved mobility of the USB host while reducing costs and power consumption associated with the USB hub.

Before discussing exemplary aspects of a USB split cable that include specific aspects of the present disclosure, a brief overview of a conventional USB hub enabling connections between a USB host and multiple device clients is first provided in FIG. 1. The discussion of specific exemplary aspects of connecting a USB host to multiple device clients using a USB Type-C split cable starts below with reference to FIG. 2.

In this regard, FIG. 1 is a schematic diagram of an exemplary conventional USB hub 100 for supporting a point-to-multipoint USB connection topology. The conventional USB hub 100 may include an upstream facing port (UFP) 102, which may be a USB receptacle for accepting a USB plug 104 attached to one end of a USB host cable section 106. The other end of the USB host cable section 106 connects to a USB host.

The conventional USB hub 100 also includes a plurality of downstream facing ports (DFPs) 108(1)-108(X), which may be a plurality of USB receptacles for accepting a plurality of USB plugs 110(1)-110(X), respectively. The plurality of USB plugs 110(1)-110(X) is respectively attached to a plurality of USB client device cable sections 112(1)-112(X). The plurality of USB client device cable sections 112(1)-112(X) connects to a plurality of USB device clients (not shown).

With continuing reference to FIG. 1, the conventional USB hub 100 must employ a controller (not shown) and provide multiple USB physical (PHY) circuits (not shown) to support the UFP 102 and the plurality of DFPs 108(1)-108(X). As such, the conventional USB hub 100 typically receives electrical power from an external power source (e.g., a wall outlet) via a power cable 114, thus limiting mobility of the conventional USB hub 100, the USB host, and the plurality of device clients. Furthermore, the controller and the multiple USB PHY circuits employed to support the plurality of DFPs 108(1)-108(X) can also add additional costs to the conventional USB hub 100. Hence, it may be desirable to support the point-to-multipoint USB connection topology without using the conventional USB hub 100 to improve mobility and reduce hardware costs and power consumption associated with the conventional USB hub 100.

Figure 2:
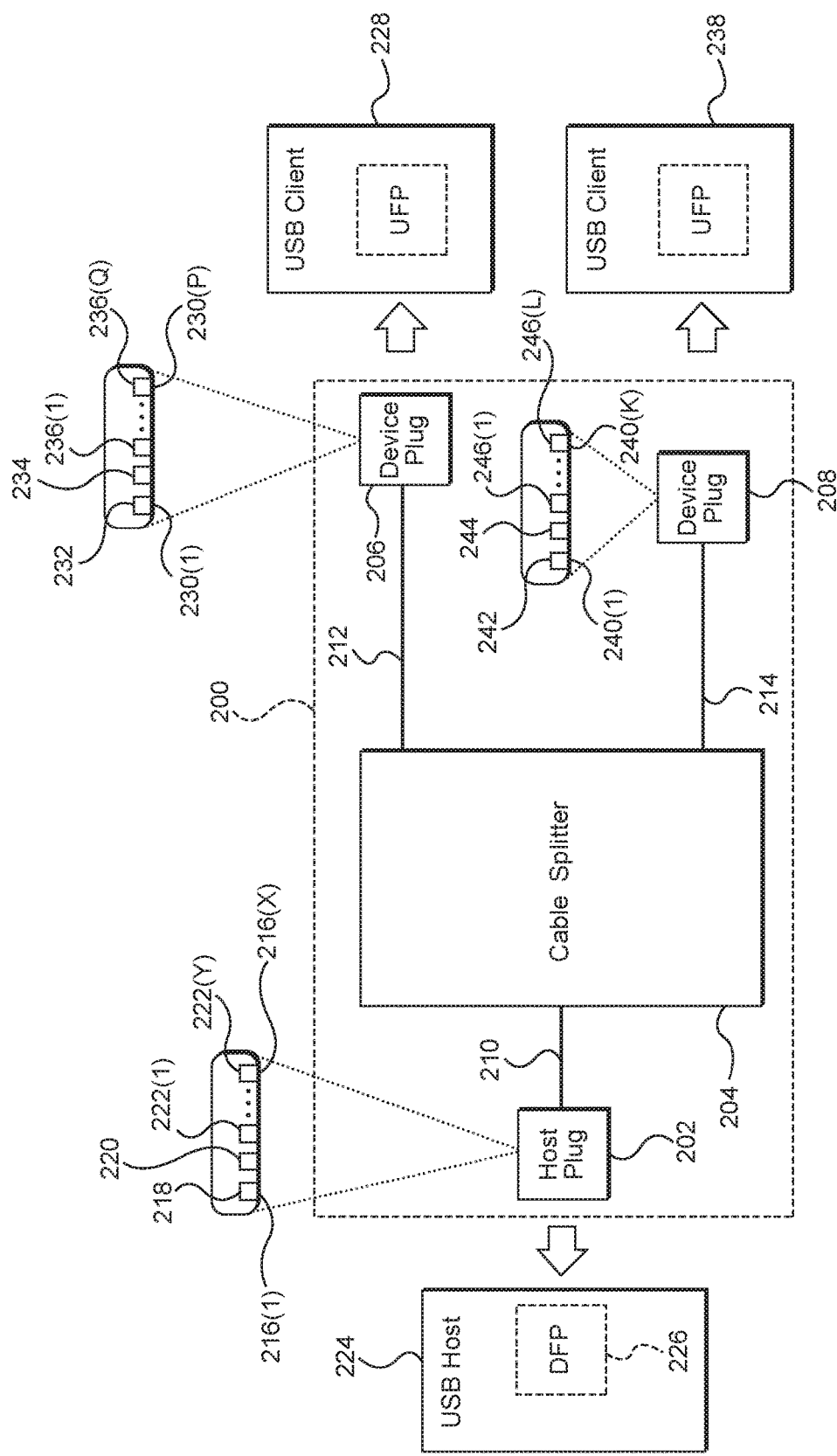
FIG. 2 is a schematic diagram of an exemplary USB split cable configured to support point-to-multipoint USB connections without using the USB hub of FIG. 1.

In this regard, FIG. 2 is a schematic diagram of an exemplary USB split cable 200 configured to support point-to-multipoint USB connections without using the conventional USB hub 100 of FIG. 1.

With reference to FIG. 2, the USB split cable 200 comprises a host plug 202, a cable splitter 204, a first device plug 206, and a second device plug 208. The host plug 202 is conductively coupled to the cable splitter 204 via a host cable section 210. The first device plug 206 is conductively coupled to the cable splitter 204 via a first device cable section 212. The second device plug 208 is conductively coupled to the cable splitter 204 via a second device cable section 214. Although only the first device plug 206 and the second device plug 208 are illustrated, it shall be appreciated that plural first device plugs 206 and plural second device plugs 208 may be conductively coupled to the cable splitter 204. It shall also be appreciated that plural device plugs in addition to the illustrated first device plug 206 and the illustrated second device plug 208 may be conductively coupled to the cable splitter 204.

The host plug 202 includes a plurality of host pins 216(1)-216(X). The plurality of host pins 216(1)-216(X) further includes at least one power pin 218, at least one control pin 220, and a plurality of data pins 222(1)-222(Y). The host plug 202 provides a means for plugging into a USB host 224. In a non-limiting example, the host plug 202 may be a USB Full-Featured Type-C plug with a total of twenty-four (24) pins. The USB host 224 includes a DFP 226, which is a USB Type-C receptacle for example, configured to accept the host plug 202. Once the host plug 202 is plugged into the DFP 226, the USB split cable 200 is connected to the USB host 224. More specific discussions on USB Full-Featured Type-C plug pin layout and the USB Type-C receptacle pin layout are provided later with references to FIGS. 3A and 3B, respectively.

With continuing reference to FIG. 2, the first device plug 206 may be provided in a USB Type-C form factor. The first device plug 206 provides a means for plugging into a first USB device client 228. The first device plug 206 has a first set of pins 230(1)-230(P) that includes at least one first power pin 232, at least one first control pin 234, and one or more first data pins 236(1)-236(Q). The first set of pins 230(1)-230(P) has a first pin count that is less than or equal to a pin count of the plurality of host pins 216(1)-216(X) in the host plug 202. The first device plug 206 is a USB Full-Featured Type-C plug when the first pin count is equal to the pin count of the plurality of host pins 216(1)-216(X) in the host plug 202. Otherwise, when the first pin count is less than the pin count of the plurality of host pins 216(1)-216(X) included in the host plug 202, the first device plug 206 may be a customized USB Type-C plug. More detailed discussions of the first set of pins 230(1)-230(P) included in the first device plug 206 are provided later in reference to FIG. 4.

In another non-limiting example, the second device plug 208 may also be provided in the USB Type-C form factor. The second device plug 208 provides a means for plugging into a second USB device client 238. The second device plug 208 has a second set of pins 240(1)-240(K) that includes at least one second power pin 242, at least one second control pin 244, and one or more second data pins 246(1)-246(L). The second set of pins 240(1)-240(K) has a second pin count that is less than the pin count of the plurality of host pins 216(1)-216(X) included in the host plug 202. In this regard, the second device plug 208 is a customized USB Type-C plug. More detailed discussions of the second set of pins 240(1)-240(K) included in the second device plug 208 are provided later in reference to FIG. 4.

With continuing reference to FIG. 2, the host cable section 210 includes a plurality of conductive wires (not shown) that is respectively coupled to the plurality of host pins 216(1)-216(X). The first device cable section 212 comprises a plurality of first conductive wires (not shown) that is coupled to the first power pin 232, the first control pin 234, and the one or more first data pins 236(1)-236(Q). The second device cable section 214 comprises a plurality of second conductive wires (not shown) that is coupled to the second power pin 242, the second control pin 244, and the one or more second data pins 246(1)-246(L).

The cable splitter 204, which provides a means for splitting cable, conductively couples the first power pin 232 in the first device plug 206 and the second power pin 242 in the second device plug 208 to the power pin 218 in the host plug 202. As such, the first device plug 206 and the second device plug 208 are able to share electrical power provided by the USB host 224 through the power pin 218 in the host plug 202. The cable splitter 204 also conductively couples the first control pin 234 in the first device plug 206 and the second control pin 244 in the second device plug 208 to the control pin 220 in the host plug 202, thus allowing the USB host 224 to provide control signal to the first device plug 206 and the second device plug 208 through the control pin 220 in the host plug 202. In a non-limiting example, the control pin 220 in the host plug 202 may be configured to control the first device plug 206 and the second device plug 208 according to a time-division schedule or a round-robin schedule. By being able to share the electrical power via the power pin 218 and receive the control signal via the control pin 220, the first device plug 206 and the second device plug 208 can be configured to function concurrently. As such, the first USB device client 228 and the second USB device client 238 are also able to function concurrently.

With continuing reference to FIG. 2, the cable splitter 204 conductively couples the one or more first data pins 236(1)-236(Q) to respective data pins 222 among the plurality of data pins 222(1)-222(Y) to enable data communication between the USB host 224 and the first USB device client 228. The cable splitter 204 also conductively couples the one or more second data pins 246(1)-246(L) to respective data pins 222 among the plurality of data pins 222(1)-222(Y) to enable data communication between the USB host 224 and the second USB device client 238. In a first non-limiting example, the host plug 202 allows the USB host 224 to communicate data concurrently with the first USB device client 228 and the second USB device client 238 over the one or more first data pins 236(1)-236(Q) and the one or more second data pins 246(1)-246(L), respectively. In a second non-limiting example, the host plug 202 allows the USB host 224 to communicate data alternately with the first USB device client 228 and the second USB device client 238 over the one or more first data pins 236(1)-236(Q) and the one or more second data pins 246(1)-246(L), respectively.

As previously mentioned, the host plug 202 may be the USB Full-Featured Type-C plug and the DFP 226 may be the USB Type-C receptacle. The respective pin layouts of the USB Full-Featured Type-C plug and the USB Type-C receptacle are discussed next in accordance with the USB Type-C Cable and Connector Specification Release 1.1 (hereinafter USB Type-C specification) published by the USB Promotion Group on Apr. 3, 2015.

In this regard, FIG. 3A is a schematic diagram of an exemplary USB Full-Featured Type-C plug interface 300 as defined in the USB Type-C specification. Elements of FIG. 2 are referenced in connection with FIG. 3A and will not be re-described herein.

The USB Full-Featured Type-C plug interface 300 comprises twenty-four (24) pins that are labeled from A1 to A12 and B1 to B12. The pins A1 to A12 are disposed from right to left while the pins B1 to B12 are disposed from left to right. Among the 24 pins, pins A4, A9, B4, and B9 are bus power ($V_{BUS}$) pins that correspond to the power pin 218 (not shown) in the host plug 202 (not shown). Pins A5 and B5 are configuration channel (CC) pins that correspond to the control pin 220 (not shown) in the host plug 202. Pins A6 and A7 are a pair of high-speed data pins in the host plug 202. Pins A2, A3, B2, and B3 are super speed data transmit (TX) pins. Pins A10, A11, B10, and B11 are super speed data receive (RX) pins. The super speed data TX pins A2, A3, B2, and B3 may be respectively grouped with the super speed data RX pins B11, B10, A11, and A10 to form at least one pair of super speed data pins in the host plug 202. Pins A8 and B8 provide at least one sideband use (SBU) pin in the host plug 202. Together, the high-speed data pins A6 and A7, the super speed data TX pins A2, A3, B2, and B3, the super speed data RX pins B11, B10, A11, and A10, and the SBU pins A8 and B8 constitute the plurality of data pins 222(1)-222(Y) (not shown) in the host plug 202. Additionally, pins A1, A12, B1, and B12 provide at least one return current path (GND) pin in the host plug 202. Pins B6 and B7 are unused.

FIG. 3B is a schematic diagram of an exemplary USB Type-C receptacle interface 302 as defined in the USB Type-C specification. Elements of FIGS. 2 and 3A are referenced in connection with FIG. 3B and will not be re-described herein.

The USB Type-C receptacle interface 302 also comprises 24 pins that are labeled from A1 to A12 and B1 to B12. In contrast to the USB Full-Featured Type-C plug interface 300, the pins A1 to A12 are disposed from left to right while the pins B1 to B12 are disposed from right to left.

Among the 24 pins, pins A4, A9, B4, and B9 are $V_{BUS}$ pins that correspond respectively to the $V_{BUS}$ pins A9, A4, B9, and B4 in the USB Full-Featured Type-C plug interface 300. CC pins A5 and B5 correspond respectively to the SBU pins A8 and B8 in the USB Full-Featured Type-C plug interface 300. High-speed data pins A6 and A7 correspond respectively to the high-speed data pins A7 and A6 in the USB Full-Featured Type-C plug interface 300. Super speed data TX pins A2, A3, B2, and B3 correspond respectively to the super speed data RX pins A11, A10, B11, and B10 in the USB Full-Featured Type-C plug interface 300. Super speed data RX pins A10, A11, B10, and B11 correspond respectively to the super speed data TX pins A3, A2, B3, and B2 in the USB Full-Featured Type-C plug interface 300. High-speed data pins B6 and B7 have no corresponding pins in the USB Full-Featured Type-C plug interface 300.

Figure 4:
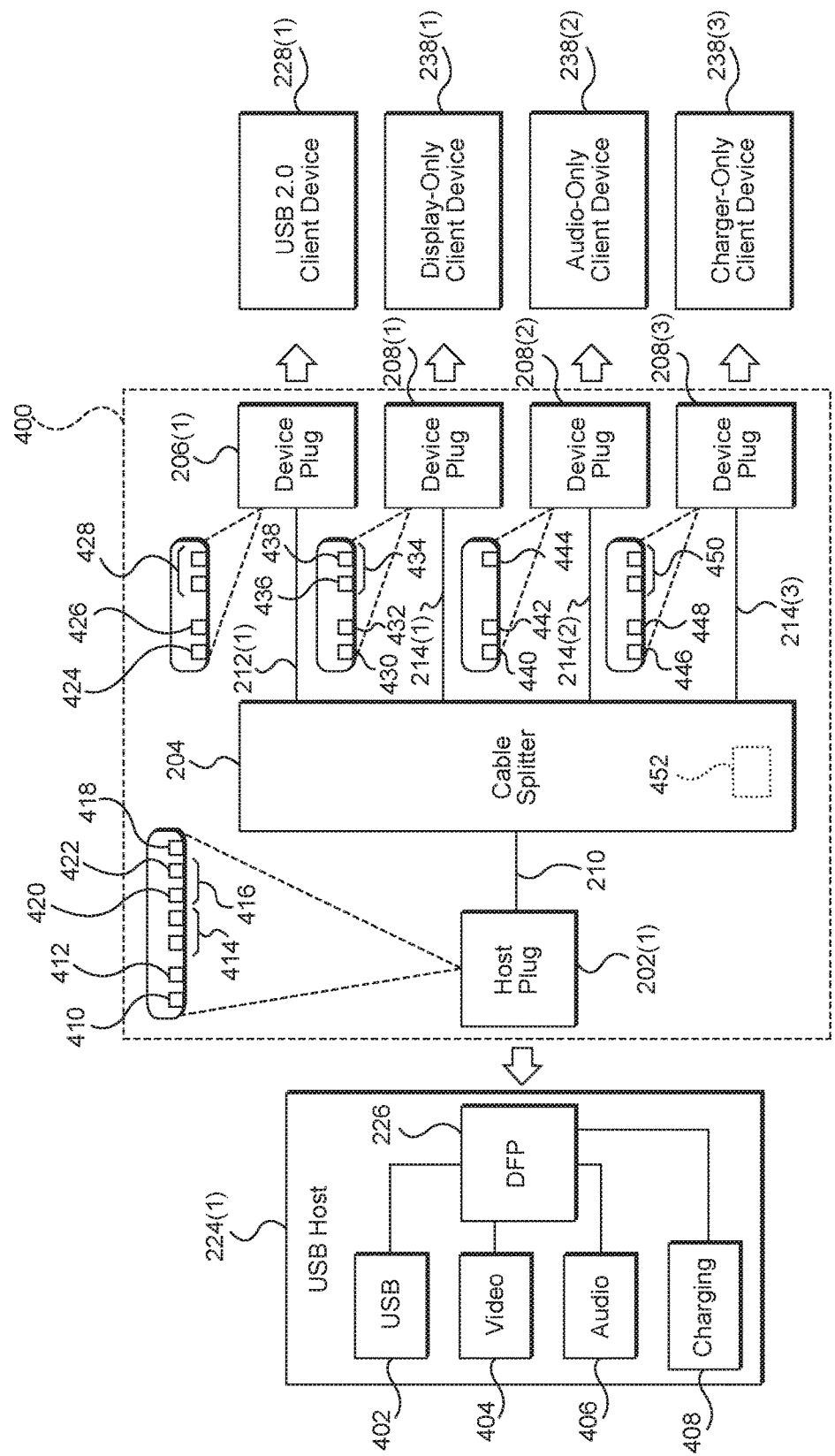
FIG. 4 is a schematic diagram of an exemplary USB Type-C split cable configured to support the point-to-multipoint USB connections of FIG. 2.

As previously discussed in FIG. 2, the host plug 202 may be a USB Full-Featured Type-C plug and the DFP 226 may be a USB Type-C receptacle. Further according to FIG. 2, the first device plug 206 and the second device plug 208 may both be in USB Type-C form factors. In this regard, FIG. 4 is a schematic diagram of an exemplary USB Type-C split cable 400 configured to support the point-to-multipoint USB connections of FIG. 2. Elements of FIGS. 2 and 3A are referenced in connection with FIG. 4 and will not be re-described herein.

With reference to FIG. 4, in a non-limiting example, a USB host 224(1) includes a high-speed USB (USB 2.0) circuitry 402, video circuitry 404, audio circuitry 406, and charging circuitry 408. The USB Type-C split cable 400 is configured to connect the USB 2.0 circuitry 402, the video circuitry 404, the audio circuitry 406, and the charging circuitry 408 to a USB 2.0 device client 228(1), a display-only device client 238(1), an audio-only device client 238(2), and a charger-only device client 238(3), respectively. The USB 2.0 device client 228(1) is a non-limiting example of the first USB device client 228. The display-only device client 238(1), the audio-only device client 238(2), and the charger-only device client 238(3) are non-limiting examples of the second USB device client 238. The USB 2.0 device client 228(1), the display-only device client 238(1), the audio-only device client 238(2) and the charger-only device client 238(3) as illustrated in FIG. 4 shall not be interpreted as limiting. It shall be appreciated that the display-only device client 238(1), the audio-only device client 238(2), and the charger-only device client 238(3) can also be non-limiting examples of the first USB device client 228. Likewise, the USB 2.0 device client 228(1) can also be non-limiting example of the second USB device client 238. The USB 2.0 circuitry 402, the video circuitry 404, the audio circuitry 406, and the charging circuitry 408 are connected to the DFP 226, which is a USB Type-C receptacle, in the USB host 224(1). A host plug 202(1), which is a USB Full-Featured Type-C plug having the USB Full-Featured Type-C plug interface 300 (not shown), connects the USB 2.0 circuitry 402, the video circuitry 404, the audio circuitry 406, and the charging circuitry 408 to the cable splitter 204 via the host cable section 210.

The host plug 202(1) includes at least one $V_{BUS}$ pin 410 that corresponds to the at least one power pin 218 in the host plug 202. The host plug 202(1) also includes at least one CC pin 412 that corresponds to the control pin 220 in the host plug 202. The host plug 202(1) also includes a pair of high-speed data pins 414, at least one pair of super speed data pins 416, and at least one SBU pin 418. According to previous discussions in FIG. 3A, the $V_{BUS}$ pin 410 may be any of the $V_{BUS}$ pins A4, A9, B4, and B9 in the USB Full-Featured Type-C plug interface 300. The CC pin 412 may be any of the CC pins A5 and B5 in the USB Full-Featured Type-C plug interface 300. The pair of high-speed data pins 414 may be the high-speed data pins A6 and A7 in the USB Full-Featured Type-C plug interface 300. The pair of super speed data pins 416 includes a super speed data TX pin 420 that corresponds to any of the super speed data TX pins A2, A3, B2, and B3 in the USB Full-Featured Type-C plug interface 300. The pair of super speed data pins 416 also includes a super speed data RX pin 422 that corresponds to any of the super speed data RX pins A10, A11, B10, and B11 in the USB Full-Featured Type-C plug interface 300. The SBU pin 418 may be any of the pins A8 and B8 in the USB Full-Featured Type-C plug interface 300.

With continuing reference to FIG. 4, the cable splitter 204 is conductively coupled to a first device plug 206(1), which is an example of the first device plug 206 of FIG. 2, via a first device cable section 212(1). The first device plug 206(1), which is configured to function as a USB high-speed plug in a non-limiting example, includes at least one first $V_{BUS}$ pin 424, at least one first CC pin 426, and a pair of first high-speed data pins 428. The first $V_{BUS}$ pin 424 may be conductively coupled to the $V_{BUS}$ pin 410 in the host plug 202(1) via the cable splitter 204. The first CC pin 426 may be conductively coupled to the CC pin 412 in the host plug 202(1) via the cable splitter 204. The pair of first high-speed data pins 428 may be conductively coupled to the pair of high-speed data pins 414 in the host plug 202(1) via the cable splitter 204. The first device plug 206(1) may be provided in a USB Type-C plug form factor but includes a lesser number of pins than a USB Full-Featured Type-C plug. Alternatively, the first device plug 206(1) may be provided in a USB high-speed plug form factor that is different from the USB Type-C plug form factor. As configured, the first device plug 206(1) enables connection between the USB 2.0 circuitry 402 in the USB host 224(1) and the USB 2.0 device client 228(1).

With continuing reference to FIG. 4, the cable splitter 204 is also conductively coupled to a second device plug 208(1), which is an example of the second device plug 208 of FIG. 2, via a second device cable section 214(1). The second device plug 208(1), which is configured to function as a USB display adaptor, includes at least one second $V_{BUS}$ pin 430, at least one second CC pin 432, and at least one pair of second super speed data pins 434 that further includes a second super speed data TX pin 436 and a second super speed data RX pin 438. The second $V_{BUS}$ pin 430 may be conductively coupled to the $V_{BUS}$ pin 410 in the host plug 202(1) via the cable splitter 204. The second CC pin 432 may be conductively coupled to the CC pin 412 in the host plug 202(1) via the cable splitter 204. The pair of second super speed data pins 434 may be conductively coupled to the pair of super speed data pins 416 in the host plug 202(1) via the cable splitter 204. More specifically, the second super speed data TX pin 436 and the second super speed data RX pin 438 are conductively coupled to the super speed data RX pin 422 and the super speed data TX pin 420 in the host plug 202(1), respectively. The second device plug 208(1) may be provided in the USB Type-C form factor with a lesser number of pins than a USB Full-Featured Type-C plug. Alternatively, the second device plug 208(1) may be provided in a USB display adaptor form factor that is different from the USB Type-C plug form factor. As configured, the second device plug 208(1) enables connection between the video circuitry 404 in the USB host 224(1) and the display-only device client 238(1).

With continuing reference to FIG. 4, the cable splitter 204 is also conductively coupled to a second device plug 208(2), which is another example of the second device plug 208 of FIG. 2, via a second device cable section 214(2). The second device plug 208(2), which is configured to function as a USB audio plug, includes at least one second $V_{BUS}$ pin 440, at least one second CC pin 442, and at least one second SBU pin 444. The second $V_{BUS}$ pin 440 may be conductively coupled to the $V_{BUS}$ pin 410 in the host plug 202(1) via the cable splitter 204. The second CC pin 442 may be conductively coupled to the CC pin 412 in the host plug 202(1) via the cable splitter 204. The second SBU pin 444 may be conductively coupled to the SBU pin 418 in the host plug 202(1) via the cable splitter 204. The second device plug 208(2) may be provided in the USB Type-C plug form factor with a lesser number of pins than a USB Full-Featured Type-C plug. Alternatively, the second device plug 208(2) may be provided in a USB audio plug form factor that is different from the USB Type-C plug form factor. As configured, the second device plug 208(2) enables connection between the audio circuitry 406 in the USB host 224(1) and the audio-only device client 238(2).

With continuing reference to FIG. 4, the cable splitter 204 is also conductively coupled to a second device plug 208(3), which is another example of the second device plug 208 of FIG. 2, via a second device cable section 214(3). The second device plug 208(3), which is configured to function as a USB charger, includes at least one second $V_{BUS}$ pin 446, at least one second CC pin 448, and a pair of second high-speed data pins 450. The second $V_{BUS}$ pin 446 may be conductively coupled to the $V_{BUS}$ pin 410 in the host plug 202(1) via the cable splitter 204. The second CC pin 448 may be conductively coupled to the CC pin 412 in the host plug 202(1) via the cable splitter 204. The pair of second high-speed data pins 450 may be conductively coupled to the pair of high-speed data pins 414 in the host plug 202(1) via the cable splitter 204. The second device plug 208(3) may be provided in the USB Type-C plug form factor with a lesser number of pins than a USB Full-Featured Type-C plug. Alternatively, the second device plug 208(3) may be provided in a USB charger plug form factor that is different from the USB Type-C plug form factor. As configured, the second device plug 208(3) enables connection between the charging circuitry 408 in the USB host 224(1) and the charger-only device client 238(3). In a non-limiting example, the charger-only device client 238(3) may be a power adaptor for plugging into a power outlet on a wall. In this regard, the USB Type-C split cable 400 is able to draw electrical power from the charger-only device client 238(3) to power concurrently the USB host 224(1), the USB 2.0 device client 228(1), the display-only device client 238(1), and the audio-only device client 238(2).

It is also possible to provide the first device cable section 212(1) and the second device cable sections 214(1)-214(3) in different lengths. In one non-limiting example, the first device cable section 212(1) may be less than or equal to four meters (4 m) when connecting to the USB 2.0 device client 228(1). In another non-limiting example, the second device cable section 214(3) may be longer than the second device cable sections 214(1)-214(2) to reach the power outlet on the wall.

With continuing reference to FIG. 4, in a non-limiting example, it is possible to include control circuitry 452 in the cable splitter 204. The control circuitry 452 may be configured to detect charging capabilities associated with the charger-only device client 238(3) and provide the charging capabilities to the USB host 224(1) as well as the display-only device client 238(1) and the audio-only device client 238(2). In this regard, the USB Type-C split cable 400 can be configured with the capability to act as a power delivery capable source when a USB power delivery (PD) capable charger (not shown) is connected to the USB Type-C split cable 400.

The USB split cable according to aspects disclosed herein may be connected to any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 5:
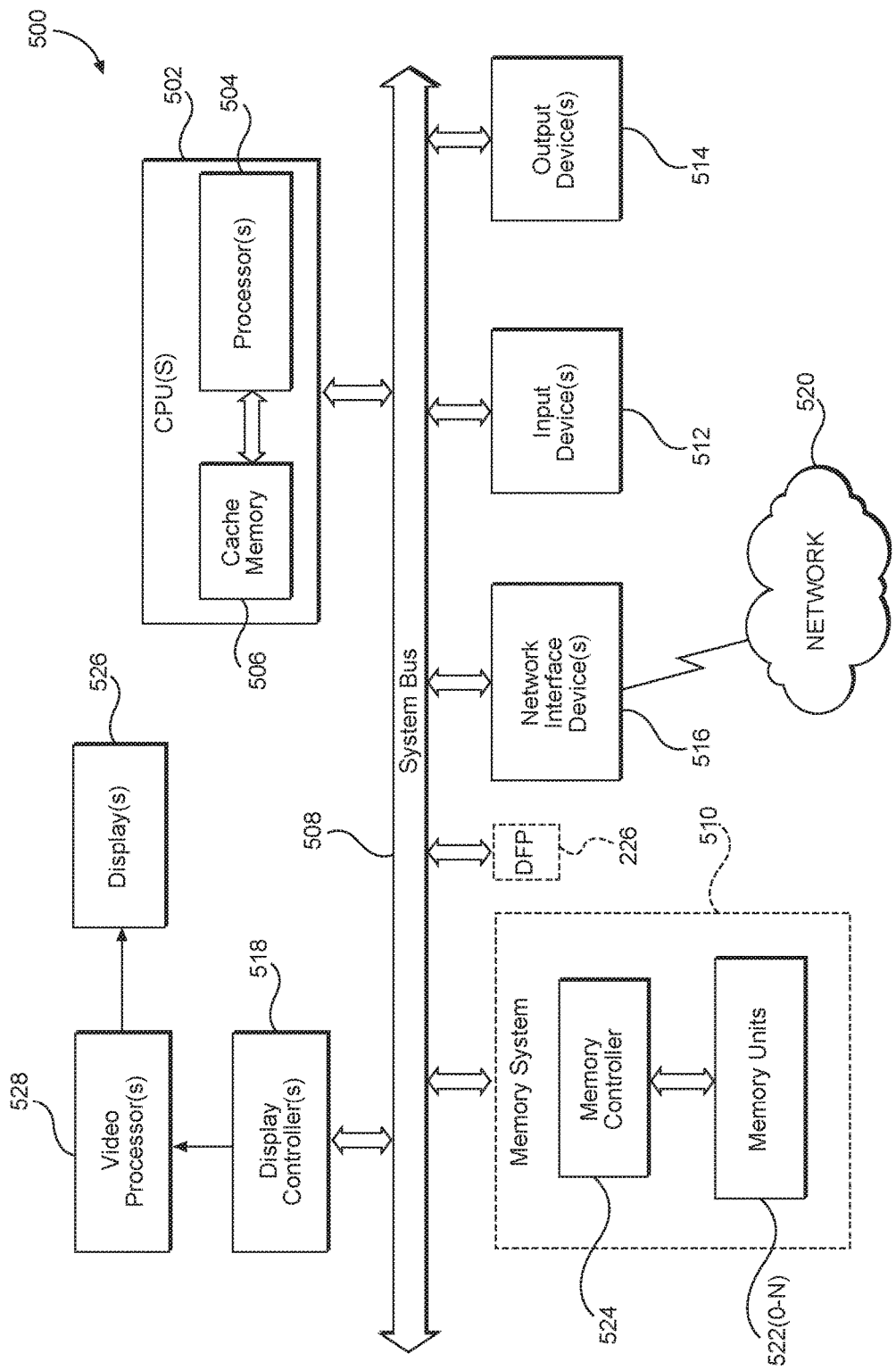
FIG. 5 is a block diagram of an exemplary processor-based system that can include the USB split cable of FIG. 2 and the USB Type-C split cable of FIG. 4.

In this regard, FIG. 5 illustrates an example of a processor-based system 500 that can communicate with the USB split cable 200 of FIG. 2 and the USB Type-C split cable 400 of FIG. 4. In this example, the processor-based system 500 includes one or more central processing units (CPUs) 502, each including one or more processors 504. The CPU(s) 502 may have cache memory 506 coupled to the processor(s) 504 for rapid access to temporarily stored data. The CPU(s) 502 is coupled to a system bus 508. As is well known, the CPU(s) 502 communicates with other devices by exchanging address, control, and data information over the system bus 508. Although not illustrated in FIG. 5, multiple system buses 508 could be provided, wherein each system bus 508 constitutes a different fabric.

Other master and slave devices can be connected to the system bus 508. As illustrated in FIG. 5, these devices can include a memory system 510, one or more input devices 512, one or more output devices 514, one or more network interface devices 516, one or more display controllers 518, and the DFP 226 of FIGS. 2 and 4, as examples. The input device(s) 512 can include any type of input device, including, but not limited to, input keys, switches, voice processors, etc. The output device(s) 514 can include any type of output device, including, but not limited to, audio, video, other visual indicators, etc. The network interface device(s) 516 can be any device configured to allow exchange of data to and from a network 520. The network 520 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 516 can be configured to support any type of communications protocol desired. The memory system 510 can include one or more memory units 522(0-N) and a memory controller 524. The DFP 226 can be connected to the host plug 202 (not shown) of FIG. 2 and the host plug 202(1) (not shown) of FIG. 4.

The CPU(s) 502 may also be configured to access the display controller(s) 518 over the system bus 508 to control information sent to one or more displays 526. The display controller(s) 518 sends information to the display(s) 526 to be displayed via one or more video processors 528, which process the information to be displayed into a format suitable for the display(s) 526. The display(s) 526 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A universal serial bus (USB) Type-C split cable, comprising:
    a host plug comprising a plurality of host pins, the plurality of host pins comprising a plurality of data pins;
    a first device plug comprising a first set of pins having a first pin count that is less than or equal to a pin count of the plurality of host pins, the first set of pins comprising one or more first data pins;
    a second device plug comprising a second set of pins having a second pin count that is less than the pin count of the plurality of host pins, the second set of pins comprising one or more second data pins; and
    a cable splitter coupled to the host plug over a host plug cable section, to the first device plug over a first device cable section, and to the second device plug over a second device cable section, wherein:
        the host plug cable section comprises a plurality of conductive wires coupled to the plurality of host pins;
        the first device cable section comprises a plurality of first conductive wires coupled to the one or more first data pins; and
        the second device cable section comprises a plurality of second conductive wires coupled to the one or more second data pins;
    wherein the first device plug and the second device plug are configured to communicate concurrently with the host plug over the one or more first data pins and the one or more second data pins, respectively; and
    wherein the cable splitter does not comprise a conventional USB hub.

2. The USB Type-C split cable of claim 1, wherein:
    the plurality of host pins further comprises at least one power pin and at least one control pin;
    the first set of pins further comprises at least one first power pin and at least one first control pin;
    the second set of pins further comprises at least one second power pin and at least one second control pin;
    the plurality of first conductive wires in the first device cable section is further coupled to the at least one first power pin and the at least one first control pin; and
    the plurality of second conductive wires in the second device cable section is further coupled to the at least one second power pin and the at least one second control pin.

3. The USB Type-C split cable of claim 2, wherein the cable splitter is configured to:
    conductively couple the at least one first power pin and the at least one second power pin to the at least one power pin in the host plug;
    conductively couple the at least one first control pin and the at least one second control pin to the at least one control pin in the host plug;
    conductively couple the one or more first data pins to respective data pins among the plurality of data pins in the host plug; and conductively couple the one or more second data pins to respective data pins among the plurality of data pins in the host plug.

4. The USB Type-C split cable of claim 3, wherein the first device plug and the second device plug are configured to receive electrical power concurrently from the at least one power pin in the host plug.

5. The USB Type-C split cable of claim 3, wherein the first device plug and the second device plug are configured to be controlled by the at least one control pin in the host plug according to a time-division schedule.

6. The USB Type-C split cable of claim 3, wherein the first device plug and the second device plug are configured to communicate alternately with the host plug over the one or more first data pins and the one or more second data pins, respectively.

7. The USB Type-C split cable of claim 3, wherein the first device plug and the second device plug are configured to function concurrently.

8. The USB Type-C split cable of claim 2, wherein the host plug comprises:
at least one bus power ($V_{BUS}$) pin corresponding to the at least one power pin;
at least one configuration channel (CC) pin corresponding to the at least one control pin;
a pair of high-speed data pins;
at least one pair of super speed data pins comprising a super speed data transmit (TX) pin and a super speed data receive (RX) pin; and
at least one sideband use (SBU) pin.

9. The USB Type-C split cable of claim 8, wherein the first device plug is a USB high-speed plug comprising:
at least one first $V_{BUS}$ pin conductively coupled to the at least one $V_{BUS}$ pin in the host plug via the cable splitter; and
a pair of first high-speed data pins conductively coupled to the pair of high-speed data pins in the host plug via the cable splitter.

10. The USB Type-C split cable of claim 9, wherein the first device plug is provided in a USB high-speed plug form factor.

11. The USB Type-C split cable of claim 8, wherein the second device plug is a USB display adaptor comprising:
at least one second $V_{BUS}$ pin conductively coupled to the at least one $V_{BUS}$ pin in the host plug via the cable splitter;
at least one second CC pin conductively coupled to the at least one CC pin in the host plug via the cable splitter; and
at least one pair of second super speed data pins comprising a second super speed data TX pin and a second super speed data RX pin, wherein:
the second super speed data TX pin is conductively coupled to the super speed data RX pin in the host plug via the cable splitter; and
the second super speed data RX pin is conductively coupled to the super speed data TX pin in the host plug via the cable splitter.

12. The USB Type-C split cable of claim 8, wherein the second device plug is a USB audio plug comprising:
at least one second $V_{BUS}$ pin conductively coupled to the at least one $V_{BUS}$ pin in the host plug via the cable splitter;
at least one second CC pin conductively coupled to the at least one CC pin in the host plug via the cable splitter; and
at least one second SBU pin conductively coupled to the at least one SBU pin in the host plug via the cable splitter.

13. The USB Type-C split cable of claim 8, wherein the second device plug is a USB charger plug comprising:
at least one second $V_{BUS}$ pin conductively coupled to the at least one $V_{BUS}$ pin in the host plug via the cable splitter; and
at least one second CC pin conductively coupled to the at least one CC pin in the host plug via the cable splitter.

14. The USB Type-C split cable of claim 13, wherein the USB charger plug further comprises a pair of second high-speed data pins conductively coupled to the pair of high-speed data pins in the host plug via the cable splitter.

15. The USB Type-C split cable of claim 1, wherein the first device cable section and the second device cable section are different lengths.

16. The USB Type-C split cable of claim 1, wherein the host plug is connected to a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

17. The USB Type-C split cable of claim 1, wherein the first device plug is connected to a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

18. The USB Type-C split cable of claim 1, wherein the second device plug is connected to a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

19. A universal serial bus (USB) Type-C split cable, comprising:
a means for plugging into a USB host comprising a plurality of host pins, the plurality of host pins comprising a plurality of data pins;
a means for plugging into a first device USB client comprising a first set of pins having a first pin count that is less than or equal to a pin count of the plurality of host pins, the first set of pins comprising one or more first data pins;
a means for plugging into a second device USB client comprising a second set of pins having a second pin count that is less than the pin count of the plurality of host pins, the second set of pins comprising one or more second data pins; and a means for splitting cable coupled to the means for plugging into the USB host over a host plug cable section, to the means for plugging into the first device USB client over a first device cable section, and to the means for plugging into the second device USB client over a second device cable section, wherein:

the host plug cable section comprises a plurality of conductive wires coupled to the plurality of host pins;

the first device cable section comprises a plurality of first conductive wires coupled to the one or more first data pins; and the second device cable section comprises a plurality of second conductive wires coupled to the one or more second data pins;

wherein the means for plugging into the first device USB client and the means for plugging into the second device USB client are configured to communicate concurrently with the means for plugging into the USB host over the one or more first data pins and the one or more second data pins, respectively; and wherein the means for splitting cable is not a conventional USB hub.

20. The USB Type-C split cable of claim 1, wherein the cable splitter does not include a USB physical (PHY) circuit configured to support an upstream facing port (UFP) a USB PHY circuit configured to support at least one downstream facing port (DFP).

* * * * *